Patented Sept. 11, 1934

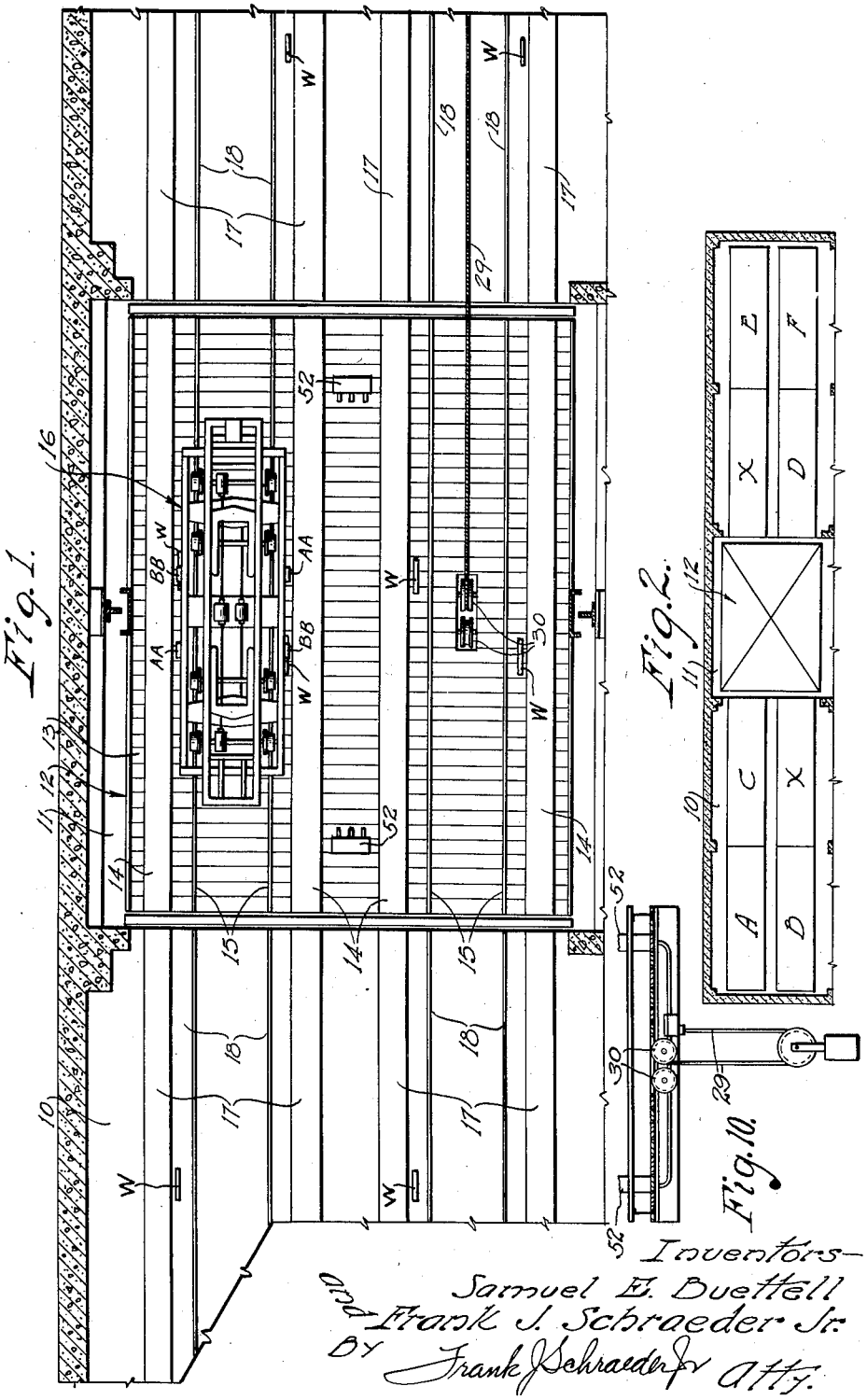

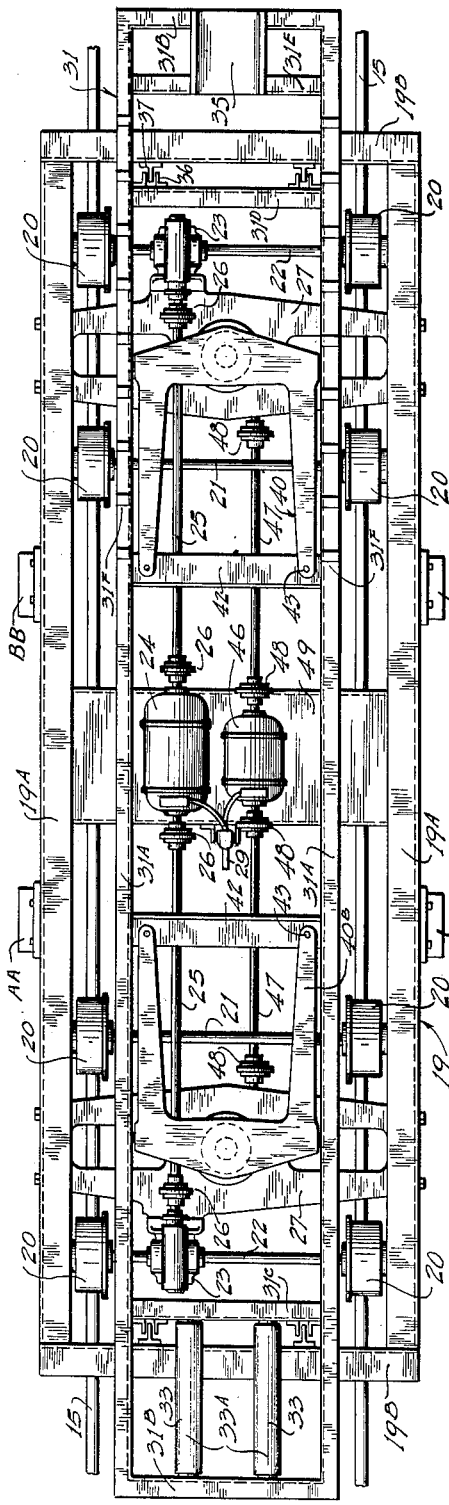

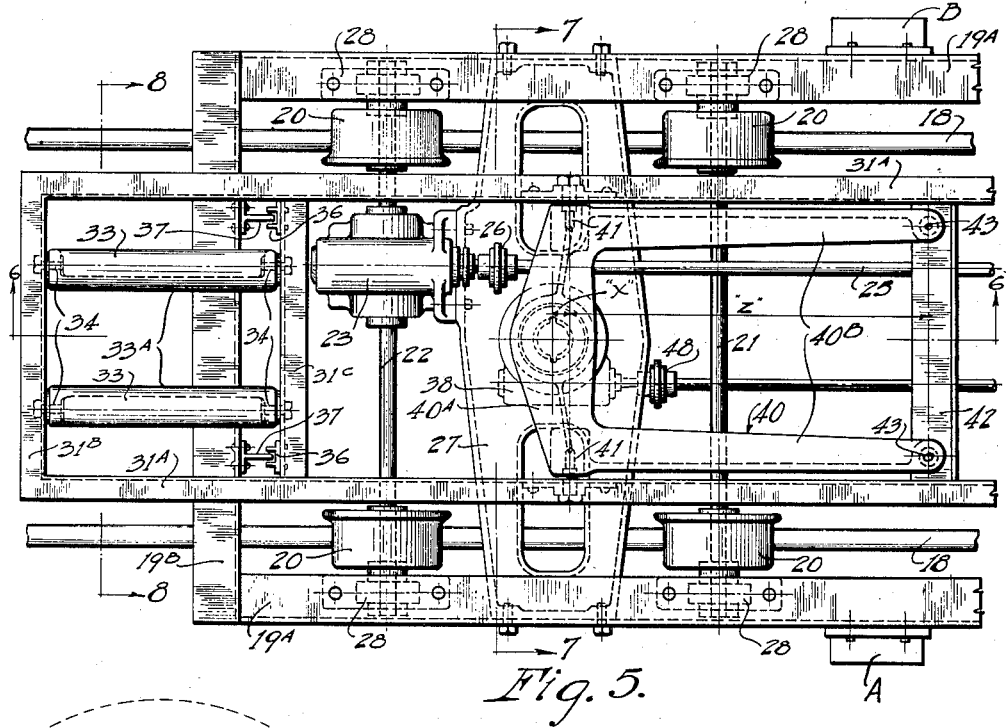

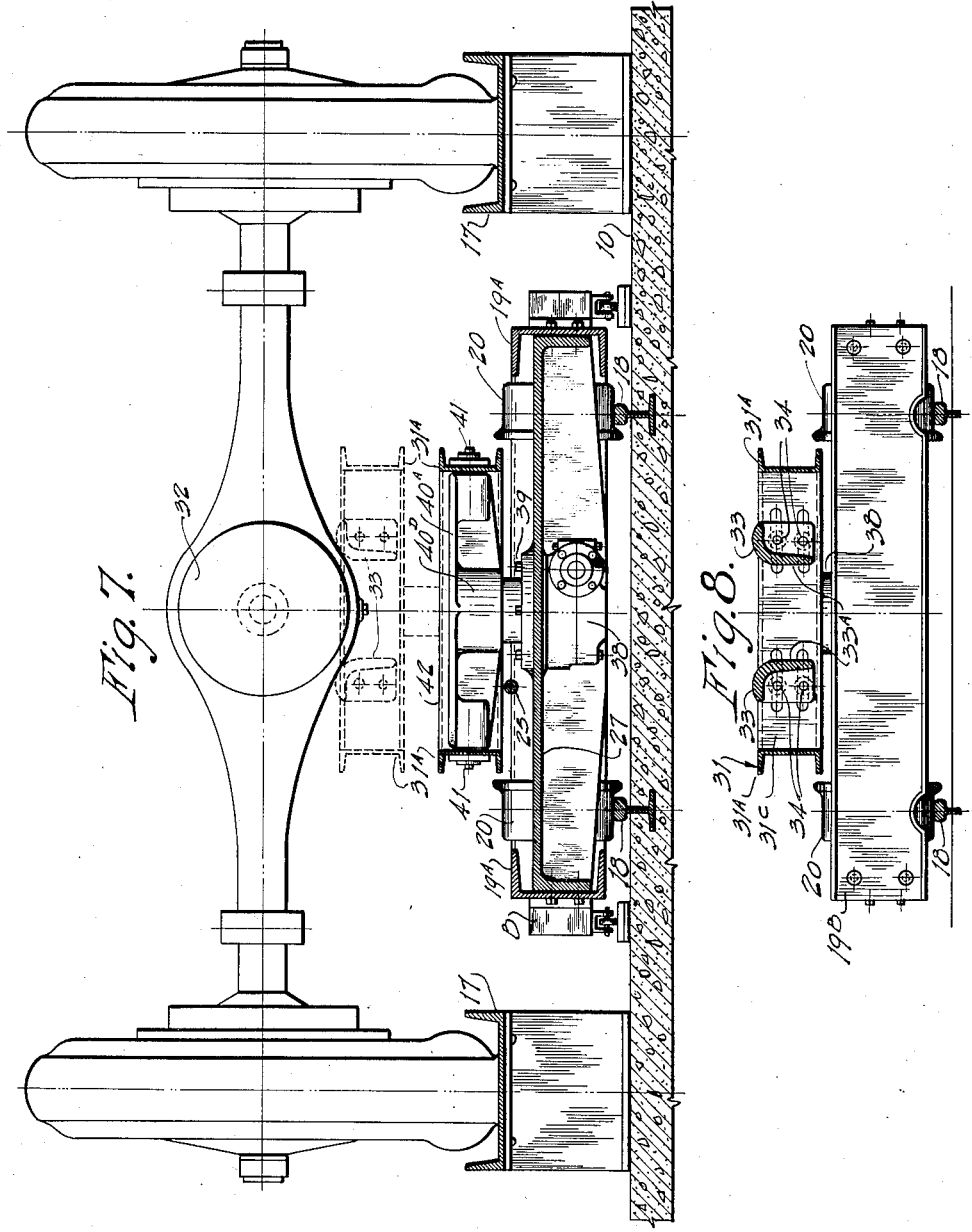

1,973,605

UNITED STATES PATENT OFFICE 1,973,605

METHOD AND APPARATUS FOR TRANSFERRING VEHICLES

Samuel E. Buettell, Chicago, and Frank J. Schraeder, Jr., Glen Ellyn, Ill., assignors, by mesne assignments, to Mechanical Parking Patents, Inc., Chicago, Ill., a corporation of Illinois Application April 26, 1930, Serial No. 447,603

21 Claims. (Cl. 254—35)

This invention relates to improvements in method and apparatus for transferring vehicles, and has particular reference to storing and reclaiming motor vehicles, and the like, in garages or multi-story garages and is readily adaptable for use in combination with horizontally movable transfer tables or vertically operable elevators.

One of the objects of the invention is to provide a simple and novel vehicle transferring mechanism which shall be comparatively low in cost of manufacture and which shall tend to enhance the utility and efficient operation of apparatus of this type and character.

Another object of the invention resides in the provision of an automobile transferring device or parker which is adapted to move the automobile from a receiving space onto an elevator and from the elevator into a storage space and vice versa; the parker comprising a movable truck having means for engaging the chassis of the automobile, preferably, the front and rear axles, whereby the automobile may be moved from one space into another.

It is also an object to provide a novel method for transferring vehicles which involves the exertion of a vertical force to partly counteract the weight of the vehicle and subsequently exerting a horizontal force to cause movement of the vehicle independently of its own tractive engagement.

Another object of the invention resides in the provision of an automobile transferring apparatus including a motor-driven truck which is provided with motor-driven means adapted to engage the chassis, axles, or underframe of an automobile with sufficient pressure to cause movement of the automobile with the transferring apparatus upon the actuation of the truck motor of the apparatus.

It is also an object of the invention to provide means for engaging the axles of an automobile including pressure actuated instrumentalities for controlling and exerting a substantially equal predetermined pressure under both axles of the car; such pressure being variable within a given range by adjustable means provided therefor.

Another object of the invention is found in the embodiment of a vehicle transferring mechanism having a pressure actuated frame member for engaging the automobile axles, which member is provided with means adapted to exert a substantially uniform load on the truck wheels of the parker regardless of the weight of the automobile handled thereby.

Another object is embodied in the provision of a motor vehicle transferring mechanism having a pair of screw-operated jacks propelled by a single motor for moving the vehicle axle engaging frame member into engagement with the axles with a predetermined minimum pressure, and means for limiting the movements of the jacks and member upon the attainment of such predetermined minimum pressure of said member against both of said axles.

Still another object of the invention is to provide an automobile transferring mechanism with a plurality of sets of wheels so arranged that the transferring mechanism will in its movement readily span and pass over the space or gap provided in its tracks for the elevator shaft doors which are positioned for operation between the elevator platform and the floor of a garage, thus eliminating the necessity of tracks or rails on the elevator shaft doors.

A further object of the invention is found in the provision and arrangement of a movably mounted supporting frame on the transferring mechanism, which frame is adapted to carry or support the automobile as it is moved over the gap provided in the automobile wheel guide tracks or channels constituting the space between the elevator platform and the floor of the garage.

A still further object of the invention is embodied in the provision of a transfer mechanism for automobiles wherein the automobile axle engaging member is connected to a lifting mechanism with a non-rigid or ball and socket connection, thus permitting such member to accommodate or adjust itself to both axles of the automobile without unnecessary strain upon the lifting mechanism or the member itself.

With the above and other objects in view, our invention consists in the novel combination, arrangement, and construction of parts and members shown in preferred embodiment in the attached drawings, described in the following specification and particularly pointed out in the appended claims:

Referring to the drawings:

Fig. 1 is a fragmentary plan view of a storage floor of an automobile multi-story garage showing an elevator platform with one of the parkers thereon and portions of the storage racks at both ends of the elevator;

Fig. 2 is a diagrammatic sketch showing storage spaces at both ends of an elevator, a portion of the floor only being shown, it being readily understood that a garage may consist of several such units as shown and that only one automobile or two or more automobiles may be parked at each elevator end;

Fig. 3 is a plan view of one of the parking mechanisms or parkers;

Fig. 4 is a side elevation of the parker shown in Fig. 3, the left hand end portion being broken away;

Fig. 5 is an enlarged plan view of one end of the parker;

Fig. 6 is a sectional elevation taken on line 6—6 of Fig. 5, showing one of the jacks and the rear axle engaging frame with the lever for controlling the pressure with which the frame engages the axle and for automatically controlling the stopping switch within the circuit of the jack motor;

Fig. 7 is a cross section taken on line 7—7 of Fig. 5;

Fig. 8 is a cross section taken on line 8—8 of Fig. 5, showing the rear axle saddle;

Fig. 9 illustrates a modified motor drive embodying an individual motor for each jack; and Fig. 10 is a vertical section of the elevator platform, in reduced scale, showing the counterweight conductor cable.

Referring now to the several illustrations:

A portion of a floor of a garage or other storage building is indicated at 10. An elevator shaft 11 is provided with an elevator 12 having a platform 13 provided with channel guides, or the like, 14, for guiding an automobile in its movement on and off said elevator platform.

The elevator platform 13 is also provided with rails 15 which guide the parking mechanism of the parker, generally indicated by numeral 16, in its movement on and off the elevator platform 13.

The floor 10 has storage racks or guide channels, or the like, indicated by numeral 17, which register with the guides 14 of the elevator 12 to guide the automobile in its rolling movement to and from said elevator.

The floor 10 has rails 18 which guide the parkers 16 in their movements in the storage compartments.

The parking apparatus shown in the attached ilustrations may be used in various systems of storage and may be adapted to handling automobiles, industrial cars, trucks, movable storage platforms, or other rolling equipment by a slight adaptation or modification. The description herein is directed to the handling of automobiles in garages employing one or more elevators; it is, however, obvious that the parking apparatus may be used in garages of one or more floors or in combination with transfer tables or ramp garages. A section of a floor of a garage is shown in Fig. 2, in which one double elevator 12 is adapted for handling automobiles in the storage spaces or compartments indicated by A, B, C, D, E, and F. The spaces X may be open or unoccupied and used for shifting of the cars C and D therein when it is desired to reclaim cars A and F. However, as above stated, Fig. 2 illustrates only one of the various systems of storage wherein the parking apparatus here shown and described may be employed.

Referring now to Figs. 3 to 8, inclusive, which illustrate a preferable form or construction of a parking mechanism, a truck 19 is provided, which is here shown fabricated of longitudinally extended parallel side channels 19$^A$ cross connected with end channels 19$^B$. The truck 19 is provided, preferably, with four sets of wheels 20. The wheels of the inner sets are rigidly mounted on shafts 21 and the wheels of the outer sets are rigidly mounted on shafts 22.

The truck driving shafts 22 are provided with suitable worm gear type speed reducers 23. A single suitable electric motor 24 is provided for propelling shafts 22 through the speed reducers 23 by means of the shafts 25 which are connected to opposite ends of the motor shaft and the speed reducers 23 through flexible couplings 26.

The speed reducers 23 are mounted on a cross frame 27, which is secured at its ends to the truck channels 19$^A$.

The truck wheel shafts 21 and 22 are rotatably mounted in bearings 28 which are supported on the channels 19$^A$.

The motor 24 is of a reversible type and controlled through suitable control equipment, in the present illustration, mounted upon the elevator.

The electric current, in the present instance, is supplied to the parker through a counterweighted flexible cable feed 29 extensible from the electric elevator 12, the feed cable 29 being suitably connected to the truck 19, and disposed or trained through the floor of the elevator 12 over guide sheaves 30.

The automobile axle engaging frame member 31, as shown on the drawings, is formed with a pair of parallel longitudinally extending channels 31$^A$ having cross connecting channels 31$^B$ at both ends. Intermediate cross connecting channels 31$^C$, 31$^D$, and 31$^E$ are also provided, as clearly shown in Figs. 3, 5 and 6.

A saddle adapted to support the automobile rear axle differential housing 32 is provided at one end of the member 31 and consists of a pair of longitudinally disposed members 33 supported between the cross channels 31$^B$ and 31$^C$ by means of bolts 34 adjustably extended through laterally slotted openings in the channels 31$^B$ and 31$^C$. The saddle members 33 having oppositely disposed rounded or curved bearing surfaces 33$^A$ upon which the differential housing may be supported and which curved surfaces 33$^A$ are designed to accommodate differential housings of varying diameters. The saddle members 33 are long enough to obviate the necessity of precise spotting of the parker to exactly receive the rear axle housing between and on particular points on such members 33.

The front axle of the automobile when engaged by the frame 31 will, due to varying lengths in automobile wheel bases, be engaged by the opposite end portions of the frame 31 between any of the pairs of small cleats 31$^F$, or in some cases the front axle of the automobile may directly engage on top of such cleats, and may in such case remain in such position during the movement of the automobile by the parker, or may even slip in between the cleats without disturbing the function of the parker. The cleats 31$^F$ may even be omitted, however they are provided as positive abutments to prevent any shifting of the automobile upon the frame 31 during any possible sudden stopping of the parker when the automobile is being moved.

A special dished channel-like saddle 35 is provided for supporting the front end of a front wheel drive automobile. This saddle is supported on the cross channels 31$^E$ and 31$^B$.

The full lines in Figs. 6, 7 and 8 show the parker in normal lowered position and the dotted lines show the parker in raised position during transferring movement of the automobile.

The axle engaging frame member 31 is provided with U-shaped guides 36 which are secured to cross channels 31$^C$ and 31$^D$ and which embrace the outstanding legs of the T rails 37 which are fixed to the truck and channels 19$^B$ for purpose of guiding the frame member 31 in its vertical movement into contact with the automobile axles and into normal lowered position.

The raising and lowering mechanism for the frame member 31 consists of a pair of screw jacks 38 which are supported upon the cross frames 27 and secured thereto with bolts 39.

The frame member 31 is indirectly supported upon the screw jacks 38 through the medium of a pair of oppositely disposed U-shaped levers 40 preferably of cast metal.

The frame member 31 is pivotally supported by means of pins 41 which extend within the sides of the levers 40.

The levers 40, as above stated, are of general U-shape formation when viewed from above, and include a cross portion 40$^A$ with parallel integral arms 40$^B$ normally in horizontal position. The free ends of arms 40$^B$ are supported on compression coil springs 45 positioned between the lower face of the ends of said arms and a cross supporting angle 42. An upward movement of the free ends of the arms 40$^B$ is positively limited by the bolts 43, the upper ends of which are threaded in the ends of said arms 40$^B$, and the lower ends of which are movable within openings provided in the angle 42; the heads of the bolts 43 limiting the upward movement of the bolts through their engagement with the underside of the lateral legs of the angle 42.

The lifting screws of the jacks 38 are formed with ball-like heads 44 which are disposed within the sockets 40$^C$ of the inverted cup-like formation 40$^D$ formed on the underside and at the center of the cross portions 40$^A$ of the levers 40.

A single electric motor 46 is provided for operation of the two jacks 38 through shaft extensions 47 which are operatively connected through flexible couplings 48 between the motor 46 and the jacks 38.

The parker propelling motor 24 and jack motor 46 are mounted on a steel plate support 49 which is secured to the truck side channels 19$^A$.

Referring to Figs. 5 and 6, it will be observed that the levers 40 act in a sense as weigh arms during the lifting operation of the jacks, that is, the axle engaging member pivots 41 form a fulcrum for the weight arms X and Z. The distance from the center of the jack head 44 to the center of the pivot 41 is indicated as arm X, and the distance from the center of the pivot 41 to the center of the springs 45 is indicated as arm Z.

In the modification shown in Fig. 9, two motors 46' are provided instead of a single motor for operation of the jacks 38. By means of this arrangement and provision of an individual motor 46' for each of the two jacks 38, the pressure of the frame 31 under the front and rear axles of an automobile may be substantially equalized. After the jack 38 and its cooperative motor 46' has been raised and contacted the end portion of the frame 31 under the lower axle of the automobile with the predetermined pressure, the lever arms 40$^B$ of the lever 40, cooperating with such frame end, will be moved downwardly into operative engagement with a switch 50 located under the free end of one of the arms 40$^B$ which operation of the switch 50 will stop the motor 46' in circuit therewith.

The other jack 38 and its cooperative motor 46' will, however, continue raising the opposite end of the frame 31 under the relatively higher axle until such end of the frame 31 has engaged such higher axle with the predetermined pressure, whereupon its cooperative lever 40 will be operated to cause its arms 40$^B$ to move downwardly into operative engagement with the switch 50 located under one of the arms 40$^B$. The operation of the second switch 50 will stop the motor 46' in circuit therewith and retain its cooperative jack 38 in stationary position, thus engaging the frame 31 under both of the automobile axles with substantially equal pressure.

Loading operation

When an automobile is driven onto a suitable loading rack directly in front of each elevator on the incoming floor, an attendant or the elevator operator will see that the rear wheels of the automobile are in depressions provided in the automobile wheel guide tracks of the rack. When the elevator has been leveled and the elevator fire doors are completely open, the proper direction switch is actuated to project the transfer apparatus or parker into the loading rack under the automobile.

Located in the loading rack is a stationary cam or ramp W which actuates the slow-down switch AA which is mounted on the parker. When this occurs, the speed of the parker is reduced until the stopping switch BB on the parker comes into contact with the same ramp W and the parker is stopped within the proper limits so that the jack frame 31 may then be elevated to contact with axles of the automobile.

When the weigh arms of the levers 40 have functioned to operate the jack stopping switches 50, which are in series, (or in independent circuits, when individual motors are used) the propelling motor 24 of the parker may then be reversed and returned to the elevator platform with the automobile.

Mounted on the elevator platform is a cam or ramp W which slows down the parker propelling motor and stops the parker in the proper position on the elevator.

Storage operation

Upon the operation of the fire doors on the incoming or ground floor, the elevator may then be dispatched to the proper storage floor. When the desired storage floor has been reached, the elevator is leveled, and the fire doors are opened. The elevator operator then actuates the starting push button switch 52 corresponding with the storage stall selected for storage of the automobile.

These push button switches 52 are mounted at each end of the elevator platform, and are numbered to correspond with the stalls served by the parker on each storage floor.

The actuation of the proper push button operates to move the parker with the engaged automobile into the selected storage stall, in the manner hereinabove described. The parker is slowed down and stopped by ramps in the storage stall.

The jack motor (or jack motors) is then operated to lower the jack frame. This permits the rear wheels of the automobile to settle into the depressions in the storage racks and to so remain until reclaimed.

When an automobile is reclaimed from storage, the same cycle of operation is used with the exception that the frame 31 is elevated in the same manner described in the loading operation.

What we claim is:

1. The method of transferring a vehicle from an initial position to a selected position, including the steps of exerting and maintaining a predetermined vertical force to partly counteract the weight of said vehicle, automatically limiting the extent of such force, and subsequently exerting a horizontal force to cause movement of said vehicle independent of its tractive engagement.

2. A transferring device for vehicles, including a wheeled frame adapted to pass under the vehicle, means on said frame to exert a vertical and automatically limited pressure on said vehicle to partly counteract its weight and to lessen its tractive engagement, and means for propelling said transferring device.

3. A transferring device for vehicles, including a wheeled frame adapted to pass under the vehicle, adjustable means on said frame to exert a predetermined and automatically limited vertical pressure on said vehicle to partly counteract its weight and to lessen its tractive engagement, and means for propelling said transferring device.

4. A transferring apparatus for motor vehicles, including a wheeled frame adapted to be placed under the vehicle, a vertically movable device on said frame adapted to exert a vertical pressure on said vehicle to lessen its tractive engagement, and means for predetermining the degree of pressure exerted by said device.

5. A transferring apparatus for vehicles, including a wheeled frame adapted to be placed under the vehicle, a movable device on said frame to exert a vertical pressure on spaced points of said vehicle to lessen its tractive engagement, and means for limiting the pressure to a predetermined extent.

6. A transferring apparatus for vehicles, including a wheeled frame adapted to be placed under the vehicle, a movable device on said frame to exert a vertical pressure on the axles of said vehicle to lessen its tractive engagement, and means for limiting the pressure to a predetermined extent.

7. A transferring apparatus for vehicles, including a wheeled frame adapted to be placed under the vehicle, a movable device on said frame to exert a vertical pressure on the axles of said vehicle to lessen its tractive engagement, means on said device for securing said vehicle against movement relative to the device, and means for limiting the pressure to a predetermined extent.

8. A transferring apparatus for vehicles, including a wheeled frame adapted to be placed under the vehicle, a movable device on said frame to exert a vertical pressure on the axles of said vehicle to lessen its tractive engagement, means on said device for securing said vehicle against movement relative to the device, and adjustable means for limiting the pressure to a predetermined extent.

9. A transferring apparatus for vehicles, including a wheeled frame adapted to be placed under the vehicle, a movable device on said frame to exert a vertical pressure at both ends of said vehicle to relieve the latter from tractive engagement, means for equalizing the pressure at the ends of the vehicle, and adjustable means for limiting the pressure to a predetermined extent.

10. A transferring apparatus for vehicles, including a wheeled frame adapted to be placed under the vehicle, a movable device on said frame to exert a vertical pressure at both ends of said vehicle, means on said device for preventing relative movement of said vehicle to said device, means for equalizing the pressure upon uneven engagement of said device with the vehicle ends, and means for limiting the pressure to a predetermined degree.

11. A transferring apparatus for vehicles, including a wheeled frame adapted to be placed under the vehicle, a movable device on said frame to exert a vertical pressure on both axles of said vehicle, said device having a socket and abutments to position the vehicle against movement relative to the device, means for equalizing the pressure upon uneven engagement of said device with the vehicle ends, and means for limiting the pressure to a predetermined extent.

12. A transferring device for vehicles, including a wheeled frame adapted to move on the floor and be placed under a vehicle, a supplemental frame carried by said wheeled frame, a jack on each end of said wheeled frame to exert a vertical pressure on each end of said supplemental frame and said vehicle to partly counteract its weight and reduce its friction engagement with the floor, a motor on said frame for propelling said wheeled frame, and a motor for actuating said jacks.

13. A transferring device for automobiles, including a wheeled frame adapted to move on the floor and be placed under and between the wheels of an automobile, a supplemental frame carried by said wheeled frame, and provided at each of its ends with means for engaging the lower portion of an automobile, a jack on each end of said wheeled frame to exert a vertical pressure on each end of said supplemental frame, a hinged and yielding abutment at each end of said supplemental frame and superimposed above said jack and between the wheeled frame and engaged automobile, and means for actuating said jacks.

14. A transferring device for automobiles, including a wheeled frame adapted to move on the floor and be placed under and between the wheels of an automobile, a supplemental frame carried by said wheeled frame, a jack on each end of said wheeled frame to exert a vertical pressure on each end of said supplemental frame, a hinged and yielding abutment at each end of said supplemental frame and superimposed above said jack and between the wheeled frame and engaged automobile, means for operating said jacks, and means actuated by the movement of said hinged and yielding abutments for controlling the operation of said jacks.

15. A transferring device for automobiles, including a wheeled frame adapted to move on the floor and be placed under and between the wheels of an automobile, a supplemental frame carried by said wheeled frame, and provided at each of its ends with means for engaging the lower portion of an automobile, a jack on each end of said wheeled frame to exert a vertical pressure on each end of said supplemental frame, a hinged and yielding abutment at each end of said supplemental frame and superimposed above said jack and between the wheeled frame and engaged automobile, means for operating said jacks, means actuated by the movement of said hinged and yielding abutments for controlling the operation of said jacks, and means for propelling said wheeled frame.

16. A transferring device for automobiles, including a wheeled frame adapted to move on the floor and be placed under and between the wheels of an automobile, a supplemental frame carried by said wheeled frame, a jack on each end of said wheeled frame to exert a vertical pressure on each end of said supplemental frame, a hinged and yielding abutment at each end of said supplemental frame and superimposed above said jack and between the wheeled frame and engaged automobile, means for operating said jacks, and means actuated by the movement of said hinged and yielding abutments for controlling the cutting off of the operation of said jacks when the wheels of the automobile are about to be raised from the floor.

17. Transferring apparatus for motor vehicles including a movable frame adapted to be placed under the vehicle, a device on said frame for exerting an upward pressure on said vehicle, means for limiting said pressure exerted by said device, and means for propelling said apparatus with the vehicle without raising the vehicle wheels off their support.

18. Transferring apparatus for motor vehicles including a movable frame adapted to pass under the vehicle, a device on said frame for exerting an automatically controlled upward pressure on the axles of said vehicle, and means for propelling said apparatus with the vehicle without raising the vehicle wheels off their support.

19. Transferring apparatus as embodied in claim 17 and including remote control for said propelling means.

20. The method of transferring a vehicle from one location to another location which includes the steps of projecting a vehicle transferring apparatus into position to engage the vehicle, then initiating a movement of a part of said apparatus into pressure contact with said vehicle through the instrumentality of control means mounted remotely of said apparatus, then automatically stopping the movement of said part of said apparatus, and then causing a horizontal movement of said apparatus to thereby cause a movement of the vehicle independent of its motive power.

21. The method of transferring a vehicle from one location to another location which includes the steps of initiating an upward movement of a vehicle contactor through the instrumentality of a control disposed remotely to said contactor, then automatically stopping the upward movement of said contactor at a predetermined pressure application of said contactor to the vehicle, and then causing a horizontal movement of said contactor to thereby cause a movement of the vehicle independent of its motive power.

SAMUEL E. BUETTELL.
FRANK J. SCHRAEDER, Jr.